(12) United States Patent
Yagyu et al.

(10) Patent No.: US 10,001,261 B2
(45) Date of Patent: Jun. 19, 2018

(54) LIGHT SOURCE APPARATUS AND PROJECTOR

(71) Applicant: MITSUBISHI ELECTRIC CORPORATION, Tokyo (JP)

(72) Inventors: Shinji Yagyu, Tokyo (JP); Nobutaka Kobayashi, Tokyo (JP); Akihiro Yamada, Tokyo (JP); Hiroshi Kida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 99 days.

(21) Appl. No.: 14/109,271

(22) Filed: Dec. 17, 2013

(65) Prior Publication Data
US 2014/0198301 A1   Jul. 17, 2014

(30) Foreign Application Priority Data

Jan. 11, 2013   (JP) ................................. 2013-003081
Oct. 22, 2013   (JP) ................................. 2013-218794

(51) Int. Cl.
| | |
|---|---|
| *F21V 9/08* | (2018.01) |
| *G03B 21/20* | (2006.01) |
| *G03B 33/08* | (2006.01) |
| *H04N 9/31* | (2006.01) |
| *G03B 21/14* | (2006.01) |

(52) U.S. Cl.
CPC .............. *F21V 9/08* (2013.01); *G03B 21/142* (2013.01); *G03B 21/204* (2013.01); *G03B 33/08* (2013.01); *H04N 9/3114* (2013.01); *H04N 9/3158* (2013.01); *H04N 9/3164* (2013.01)

(58) Field of Classification Search
CPC ............................. F21V 14/08; G03B 21/142
USPC ...................................... 353/84; 362/84, 293
See application file for complete search history.

(56) References Cited

U.S. PATENT DOCUMENTS

| | | | |
|---|---|---|---|
| 8,348,435 B2 | 1/2013 | Ogino et al. | |
| 8,403,492 B2 | 3/2013 | Shibasaki | |
| 8,403,493 B2 | 3/2013 | Ogawa et al. | |
| 8,405,014 B2 | 3/2013 | Shibasaki | |

(Continued)

FOREIGN PATENT DOCUMENTS

| | | |
|---|---|---|
| CN | 102033397 A | 4/2011 |
| CN | 102053467 A | 5/2011 |

(Continued)

*Primary Examiner* — Steven H Whitesell Gordon
*Assistant Examiner* — Jerry Brooks
(74) *Attorney, Agent, or Firm* — Birch, Stewart, Kolasch & Birch, LLP

(57) ABSTRACT

A light source apparatus according to the present invention includes a phosphor wheel having a phosphor disposed in an annular shape on a disk-shaped base material, the phosphor serving to emit fluorescent light from excitation light, thereby forming an excitation light source having a predetermined color, and the phosphor having a discontinuous portion in a part of the annular shape, an excitation light source for emitting the excitation light with which a passage position of the circular phosphor is irradiated with respect to the phosphor wheel to be rotatively driven by the wheel motor, and a controller that controls light emission of the light source and the excitation light source synchronously with a position of the discontinuous portion with respect to an irradiation position of the excitation light.

3 Claims, 7 Drawing Sheets

SIDE SURFACE      FRONT SURFACE

(56) References Cited

U.S. PATENT DOCUMENTS

| | | | |
|---|---|---|---|
| 8,556,432 B2 | 10/2013 | Masuda | |
| 8,556,437 B2 * | 10/2013 | Miyake | F21V 7/22 257/E33.061 |
| 8,684,537 B2 | 4/2014 | Ogawa | |
| 2010/0328554 A1 | 12/2010 | Shibasaki | |
| 2011/0075103 A1* | 3/2011 | Ogawa et al. | 353/31 |
| 2011/0096296 A1 | 4/2011 | Ogawa | |
| 2011/0292349 A1* | 12/2011 | Kitano | G03B 21/20 353/31 |
| 2012/0026472 A1 | 2/2012 | Masuda | |
| 2012/0033185 A1 | 2/2012 | Chang | |
| 2012/0106126 A1 | 5/2012 | Nojima et al. | |
| 2012/0262677 A1 | 10/2012 | Ogino et al. | |
| 2014/0028984 A1* | 1/2014 | Osaka | G03B 21/2013 353/31 |
| 2014/0104583 A1 | 4/2014 | Osaka | |

FOREIGN PATENT DOCUMENTS

| | | | |
|---|---|---|---|
| CN | 102419509 A | 4/2012 | |
| EP | 2 271 120 A1 | 1/2011 | |
| JP | 2011-028244 A | 2/2011 | |
| JP | 2011-070127 A | 4/2011 | |
| JP | 2011-95388 A | 5/2011 | |
| JP | 2011-95392 A | 5/2011 | |
| JP | 4711021 B2 | 6/2011 | |
| JP | 2011-133784 A | 7/2011 | |
| JP | 2011-154168 A | 8/2011 | |
| JP | 2012-008549 A | 1/2012 | |
| JP | 2012-032634 A | 2/2012 | |
| JP | 2012-098438 A | 5/2012 | |
| JP | 2012123179 * | 6/2012 | G03B 21/14 |
| JP | 2012181394 * | 9/2012 | G03B 21/14 |
| WO | WO 2012/172672 A1 | 12/2012 | |
| WO | 2012-137305 A1 | 7/2014 | |

\* cited by examiner

F I G . 1
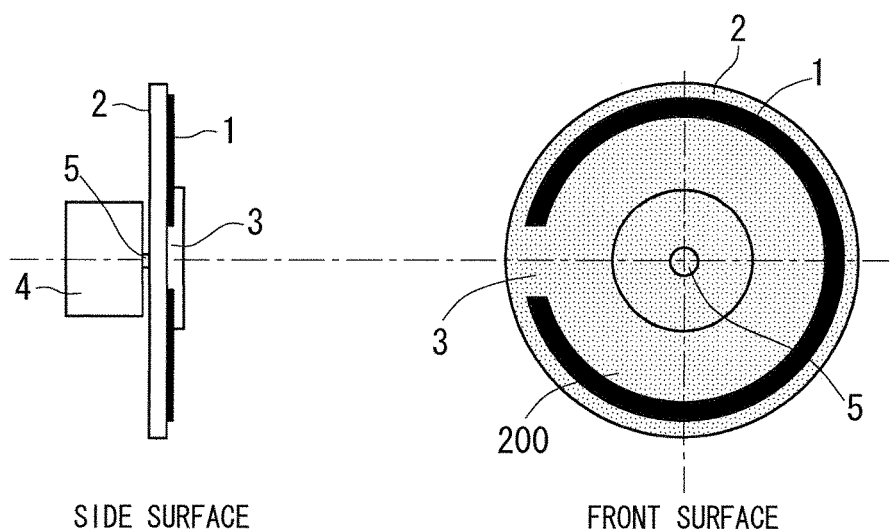
SIDE SURFACE                FRONT SURFACE
F I G . 2
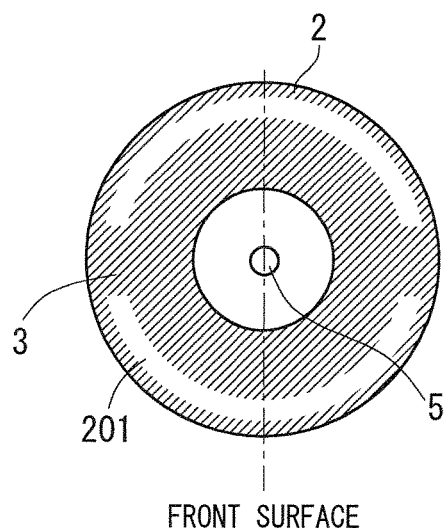
FRONT SURFACE

SIDE SURFACE      FRONT SURFACE

SIDE SURFACE      FRONT SURFACE

SIDE SURFACE   FRONT SURFACE

SIDE SURFACE   FRONT SURFACE

F I G . 1 0
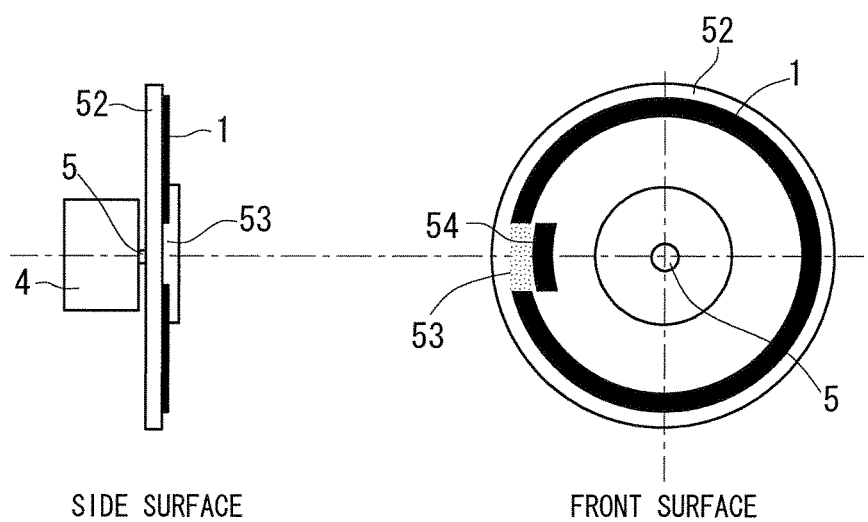
SIDE SURFACE  FRONT SURFACE

LIGHT SOURCE APPARATUS AND PROJECTOR

BACKGROUND OF THE INVENTION

Field of the Invention

The present invention relates to a light source apparatus and a projector including the light source apparatus.

Description of the Background Art

A light source apparatus provided in a projector according to the related art includes a red light source, a blue light source, an excitation light source for emitting excitation light in a blue wavelength bandwidth, a fluorescent light emitting source having a phosphor wheel to be rotatively driven by a motor, and a light source side optical system. An annular fluorescent light emitting region is provided on a disk-shaped metallic base material in the phosphor wheel of the fluorescent light emitting source. A reflection surface for reflecting light is formed in the fluorescent light emitting region, and a layer of a green phosphor for absorbing the excitation light in the blue wavelength bandwidth to emit fluorescent light in a green wavelength bandwidth is provided on the reflection surface. Both the fluorescent light turned from the layer of the green phosphor toward the reflection surface side and the excitation light turned toward the reflection surface without conversion into the fluorescent light are reflected by the reflection surface. However, the latter (the excitation light) is absorbed into the phosphor again and is thus converted into the fluorescent light. For this reason, many pieces of fluorescent light are emitted as green light from the layer of the green phosphor to the excitation light source side (for example, see Japanese Patent Application Laid-Open No. 2011-95388 (Page 14, FIG. 4).

The phosphor wheel of the light source apparatus disposed in the projector according to the related art is provided with the annular florescent light emitting region. For this reason, a phosphor material is annularly applied by utilizing a dispenser or the like in order to form the layer of the green phosphor on the disk-shaped metallic base material. When the phosphor material is applied annularly, however, an application start portion and an application end portion overlap with each other, and a thickness of the layer of the phosphor in the overlapping portion is different from thicknesses in the other portions. A quantity of the fluorescent light emitted through absorption of the excitation light subjected to irradiation into the phosphor is a sum of a fluorescent light part emitted directly and a fluorescent light part of reemitted light which is reflected by the reflection surface of the phosphor wheel. Therefore, if a difference is made in a thickness and a width of the layer of the phosphor, a total quantity of the fluorescent light is varied. As a result, there is a problem in that a luminance of the light source utilizing the fluorescent light is changed and a brightness of a image to be projected onto a screen is thus influenced (a brightness of the image is changed).

SUMMARY OF THE INVENTION

In order to solve these problems, it is an object of the present invention to provide a light source apparatus capable of stabilizing a brightness of a image to be projected onto a screen, and a projector.

A light source apparatus includes: a phosphor wheel having a phosphor disposed in an annular shape on a disk-shaped base material, the phosphor serving to emit fluorescent light from excitation light, thereby forming an excitation light source having a predetermined color, and the phosphor having a discontinuous portion for diffusing and reflecting light in a part of the annular shape; a rotation driver that rotatively drives the phosphor wheel; an excitation light source for emitting the excitation light with which a passage position of the circular phosphor is irradiated with respect to the phosphor wheel to be rotatively driven by the rotation driver; a light source having a different color from the predetermined color which is necessary to create combined light for projecting a image; a light source optical system for combining light of the light source and the excitation light source; and a controller that controls light emission of the light source and the excitation light source synchronously with a position of the discontinuous portion with respect to an irradiation position of the excitation light.

According to the present invention, there are provided a phosphor wheel having a phosphor disposed in an annular shape on a disk-shaped base material, the phosphor serving to emit fluorescent light from excitation light, thereby forming an excitation light source having a predetermined color, and the phosphor having a discontinuous portion for diffusing and reflecting light in a part of the annular shape, a rotation driver that rotatively drives the phosphor wheel, an excitation light source for emitting the excitation light with which a passage position of the circular phosphor is irradiated with respect to the phosphor wheel to be rotatively driven by the rotation driver, a light source having a different color from the predetermined color which is necessary to create combined light for projecting a image, a light source optical system for combining light of the light source and the excitation light source, and a controller that controls light emission of the light source and the excitation light source synchronously with a position of the discontinuous portion with respect to an irradiation position of the excitation light. Therefore, it is possible to stabilize a brightness of a image to be projected onto a screen.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows front and side views of a phosphor wheel unit according to a first preferred embodiment of the present invention;

FIG. 2 shows a front view of a disk-shaped metallic base material according to the first preferred embodiment of the present invention;

FIG. 10 shows front and side views of a phosphor wheel unit according to a sixth preferred embodiment of the present invention.

DESCRIPTION OF THE PREFERRED EMBODIMENTS

Figure 3:
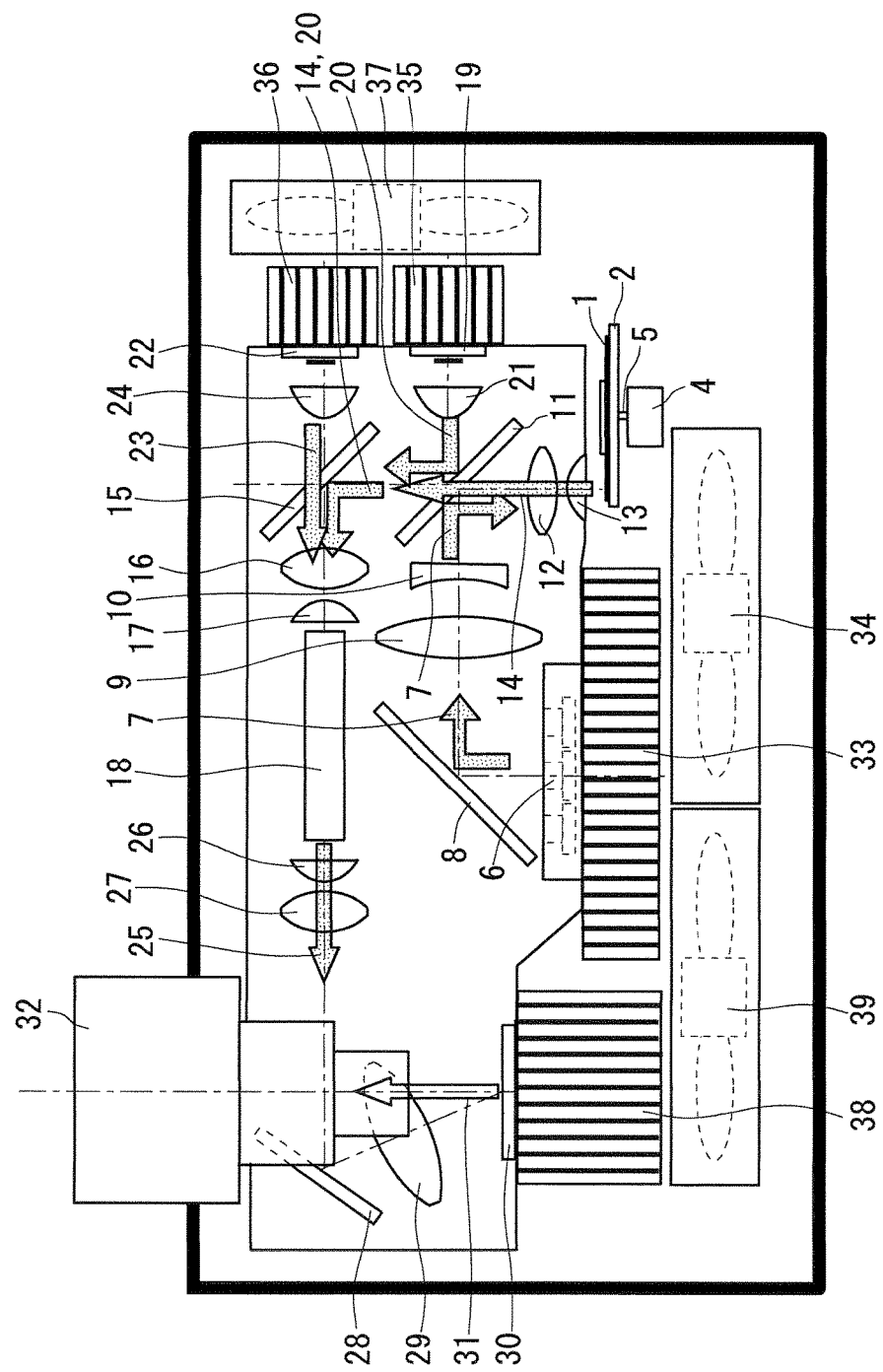
FIG. 3 shows a plan view of an optical system of a projector according to the first preferred embodiment of the present invention.

Preferred embodiments according to the present invention will be described below with reference to the drawings.

First Preferred Embodiment

FIG. 1 shows front and side views of a phosphor wheel unit provided in a light source apparatus of a projector according to a first preferred embodiment of the present invention.

As shown in FIG. 1, the phosphor wheel unit according to the first preferred embodiment includes a phosphor wheel 2, a wheel motor 4 (a rotation driver) that rotatively drives the phosphor wheel 2, and a rotary drive shaft 5 for coupling the phosphor wheel 2 to the wheel motor 4.

The phosphor wheel 2 has a disk-shaped metallic base material. The metallic base material has a phosphor 1 disposed in an annular shape. The phosphor 1 has a property for emitting fluorescent light in a green wavelength bandwidth when the metallic base material is irradiated with excitation light in a blue wavelength bandwidth. In other words, the phosphor wheel 2 has the phosphor 1 disposed in the annular shape. The phosphor 1 serves to emit the fluorescent light from the excitation light to the disk-shaped base material to obtain a light source having a predetermined color.

A diffuse reflection surface 200 for diffusing and reflecting (diffuse reflecting) light is provided on a surface of the metallic base material provided with the phosphor 1 in the phosphor wheel 2. The diffuse reflection surface 200 may have a light diffusion property by physically roughening the surface of the metallic base material through a method such as sand blast to provide a very small projection and recess structure, and may have a roughened surface such as a ground glass which is formed by a chemical treatment. Moreover, another thin film having a diffusion property may be disposed in superposition on the metallic base material.

The phosphor 1 annularly applies a phosphor material onto the reflection surface of the disk-shaped metallic base material by using a dispenser or the like and provides a clearance in such a manner that an application start part and an application end part for the phosphor material do not overlap with each other. In other words, the phosphor 1 disposed in the annular shape has a discontinuous portion 3 in a part thereof. Moreover, the discontinuous portion 3 can diffuse and reflect incident light. On the other hand, it is desirable that a portion to be a ground of the phosphor 1 should be a mirror surface in which regular reflection is predominant in consideration of a light utilization efficiency. FIG. 2 shows a front view of the disk-shaped metallic base material, and a corresponding portion to a region provided with the phosphor 1 serves as a mirror surface 201. In the case in which the light utilization efficiency does not need to have the highest priority, it is not always necessary to provide the mirror surface 201. The whole disk-shaped metallic base material may be formed by a material for carrying out diffusion and reflection and the phosphor 1 may be provided thereon.

FIG. 3 shows a plan view of an optical system of the projector according to the first preferred embodiment.

As shown in FIG. 3, when excitation light 7 having a blue wavelength is emitted from an excitation light source 6 for emitting excitation light in a blue wavelength bandwidth, the excitation light 7 is reflected by a reflection mirror 8 and passes through condensing lenses 9 and 10 in order, and is reflected by a dichroic mirror 11 for reflecting band light having a blue wavelength and transmitting band light having a green wavelength, and then passes through condensing lenses 12 and 13 in order and the phosphor 1 of the phosphor wheel 2 is irradiated with the excitation light 7. The excitation light 7 with which the phosphor 1 is irradiated emits fluorescent light 14 in a green wavelength bandwidth from the phosphor 1.

The fluorescent light 14 in the green wavelength bandwidth emitted from the phosphor 1 of the phosphor wheel 2 passes through the condensing lenses 13 and 12 in order and is transmitted through the dichroic mirror 11, and is reflected by a dichroic mirror 15 for reflecting band light having a blue wavelength and a green wavelength and transmitting band light having a red wavelength, and then passes through condensing lenses 16 and 17 in order and is incident on a light pipe 18 for converting light emitted from the light source into a luminous flux having uniform intensity distribution.

Moreover, blue light 20 emitted from a blue light source 19 passes through a condensing lens 21 and is reflected by the dichroic mirror 11, and then, is further reflected by the dichroic mirror 15 and passes through the condensing lenses 16 and 17 in order, and is incident on the light pipe 18.

In addition, red light 23 emitted from a red light source 22 passes through a condensing lens 24 and is transmitted through the dichroic mirror 15, and then passes through the condensing lenses 16 and 17 in order and is incident on the light pipe 18.

A luminous flux 25 having uniform intensity distribution obtained via the light pipe 18 passes through light guide lenses 26 and 27 in order and is reflected by an irradiation mirror 28, and then passes through a condensing lens 29 so that a image generating element 30 is irradiated with the luminous flux 25. After the image generating element 30 is irradiated with the luminous flux 25, projection image light 31 generated by the image generating element 30 passes through a projection lens 32 and is projected onto a screen (not shown) for projecting a image. In other words, a light source optical system for combining light emitted from each light source is constituted after the light pipe 18 in an optical path.

Each of the excitation light source 6, the blue light source 19, the red light source 22 and the image generating element 30 includes a cooling radiator. More specifically, the excitation light source 6 has a radiator 33 and is cooled by an air flow generated from a cooling fan 34. Moreover, the blue light source 19 has a radiator 35 and the red light source 22 has a radiator 36, and they are cooled by an air flow generated from a cooling fan 37 respectively. Furthermore, the image generating element 30 has a radiator 38 and is cooled by an air flow generated from a cooling fan 39.

Figure 4:
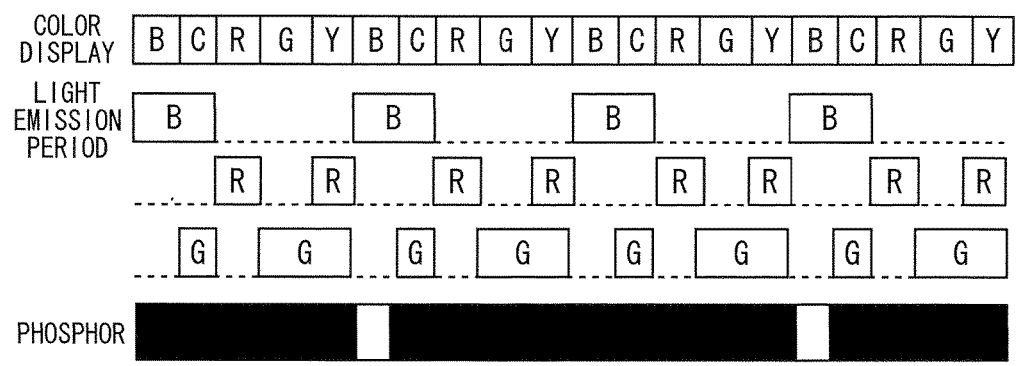
FIG. 4 shows a timing chart of a light emission period of a light source apparatus according to the first preferred embodiment of the present invention.

FIG. 4 shows a timing chart of a light emission period of the light source apparatus according to the first preferred embodiment. The projector having the light source apparatus further includes controller (not shown) that controls light emission of the light source, and the controller controls light emission periods for the green excitation light source, the blue light source and the red light source.

In FIG. 4, an axis of abscissa indicates a time. Moreover, "color display" indicates a color to be projected in time division (B represents blue, C represents cyan, R represents red, G represents green and Y represents yellow). Moreover, "light emission period" indicates light emission periods for a green excitation light source G, a blue light source B and a red light source R. "Phosphor" indicates a period (a black part in the drawing) for which the phosphor 1 disposed in the annular shape on the phosphor wheel 2 is irradiated with the excitation light in the blue wavelength bandwidth to emit fluorescent light in a green wavelength band, and a period of a white part in the drawing indicates a period corresponding to the discontinuous portion 3.

As shown in FIG. 4, the control of the light emission periods for the green excitation light source G, the blue light source B and the red light source R is carried out synchronously with a rotation phase of the phosphor wheel 2. For the light emission period of the green excitation light source G, irradiation with the excitation light 7 is carried out so that fluorescent light is emitted within a range in which the phosphor 1 is coated. Moreover, light is emitted from the blue light source B in the case in which the blue color is projected onto the screen, light is emitted from the blue light source B and the green excitation light source G at the same time in the case in which the cyan is projected, light is emitted from the red light source R in the case in which the red color is projected, light is emitted from the green excitation light source G in the case in which the green color is projected, and light is emitted from the red light source R and the green excitation light source G at the same time in the case in which the yellow color is projected. In other words, the light emission of the green excitation light source G is controlled by driving the excitation light source 6 in a necessary timing through the controller. The excitation light source 6 serves to emit the excitation light with which a passage position of the annular phosphor 1 is irradiated to the phosphor wheel 2 to be rotatively driven by the wheel motor 4. Moreover, the blue light source B and the red light source R emit light having necessary colors for creating combined light to project a image. The light emission control is carried out by driving the light sources B and R in a necessary timing through the controller.

Moreover, the controller controls the light emission of each light source synchronously with the position of the discontinuous portion 3 with respect to an irradiation position of the excitation light. A period corresponding to the discontinuous portion 3 for which the phosphor 1 is not coated is utilized in the light emission of the blue light source B or the red light source R (the light emission of the blue light source B in FIG. 4). Furthermore, the light emission is controlled by the controller in such a manner that the light emission period for the green excitation light source G is equal to or shorter than a portion other than the period corresponding to the discontinuous portion 3 (that is, a length of the phosphor 1). Accordingly, it is possible to utilize fluorescent light having a stable luminance which is emitted from the phosphor 1 in a portion in which a layer of the coated phosphor 1 has a uniform thickness and width.

As described above, according to the first preferred embodiment, the discontinuous portion 3 is provided in the annular phosphor 1 disposed on the phosphor wheel 2, and the light is emitted from the green excitation light source G synchronously with the rotation phase of the phosphor wheel 2 within the range in which the thickness and the width of the layer of the phosphor 1 are uniform. Therefore, a light quantity of the fluorescent light emitted from the phosphor 1 is stabilized so that the luminance of the green light source is made stable. Accordingly, it is possible to stabilize a brightness of a image to be projected from the projector.

Such control that the excitation light source G does not emit light is carried out for the period corresponding to the discontinuous portion 3 as described above. In some cases in which a synchronization timing is slightly shifted or the light emission of the excitation light source G is continuously carried out in a slight time before the synchronization is actually taken since the start of the control, the light reflected by the mirror surface returns to the excitation light source G if the discontinuous portion 3 is the mirror surface. It is known that return light acting as disturbance might cause a laser oscillating operation to be unstable, thereby influencing reliability when the excitation light source G is a semiconductor laser. Therefore, in the first preferred embodiment, there is employed the structure in which the discontinuous portion 3 is set to be a light diffusion surface as described above and many pieces of light are prevented from returning to the semiconductor laser.

Although the description has been given to the first preferred embodiment in which the discontinuous portion 3 of the annular phosphor 1 disposed on the phosphor wheel 2 is provided by forming the clearance in such a manner that the application start part and the application end part do not overlap with each other when the phosphor material is applied annularly by using the dispenser or the like onto the reflection surface of the disk-shaped metallic base material, the present invention is not restricted thereto. For example, it is also possible to produce the same effects as those in the preferred embodiment also in the case in which the phosphor material is once applied annularly to the whole periphery of the reflection surface of the disk-shaped metallic base material and a film for reflecting or absorbing excitation light is then stuck onto the corresponding portion to the discontinuous portion 3 or a material for reflecting or absorbing the excitation light is applied.

Second Preferred Embodiment

Figure 5:
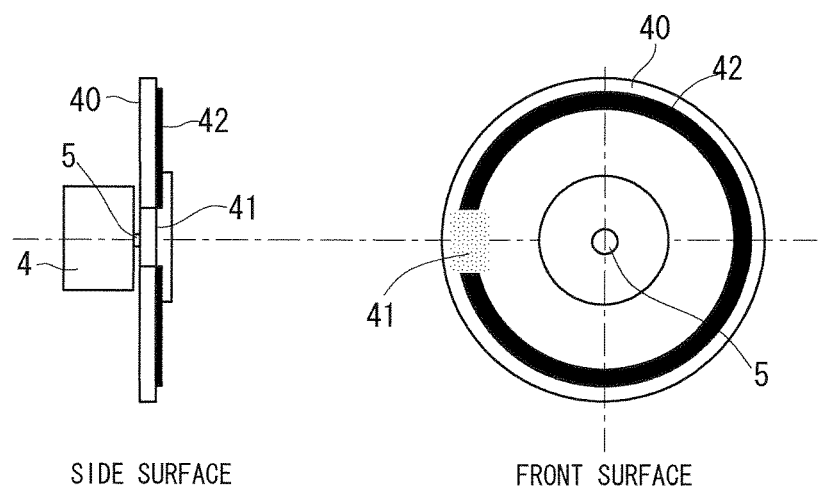
FIG. 5 shows front and side views of a phosphor wheel unit according to a second preferred embodiment of the present invention.

FIG. 5 shows front and side views of a phosphor wheel unit provided in a light source apparatus of a projector according to a second preferred embodiment of the present invention.

As shown in FIG. 5, in a phosphor wheel 40 according to the second preferred embodiment, a discontinuous portion 41 for diffusing and reflecting light is provided in a phosphor 42 disposed on a disk-shaped metallic base material of the phosphor wheel 40. Moreover, the phosphor 42 has the discontinuous portion 41 in a part thereof in the same manner as in the first preferred embodiment. However, the metallic base material has a mirror surface provided on a whole surface thereof, and a portion corresponding to a ground of the phosphor 42 neither diffuses nor reflects the light.

Since the other structures and operations (a control timing for a light emission period of each light source) is the same as in the first preferred embodiment, description will be omitted.

As described above, according to the second preferred embodiment, a region for diffusing and reflecting light is provided in only the discontinuous portion 41 of the phosphor wheel 40. Therefore, it is possible to obtain such an effect as to relieve a risk of causing instability of an operation of a semiconductor laser acting as an excitation light source in the same manner as in the first preferred embodiment. Furthermore, in the case in which there is assumed a procedure for processing a diffusing portion in addition to the metallic base material having the mirror surface provided on the whole surface, it is possible to produce an advantage that the second preferred embodiment can be implemented by a simple and inexpensive method. Moreover, the phosphor wheel 40 needs to keep a dynamic balance in rotation in order to suppress a vibration noise of a wheel motor 4. However, it is also possible to employ an advantageous structure for keeping the dynamic balance by sticking onto the metallic base material a diffusion plate corresponding to a lacking weight of the discontinuous portion of the phosphor 42 as another material.

Third Preferred Embodiment

Figure 6:
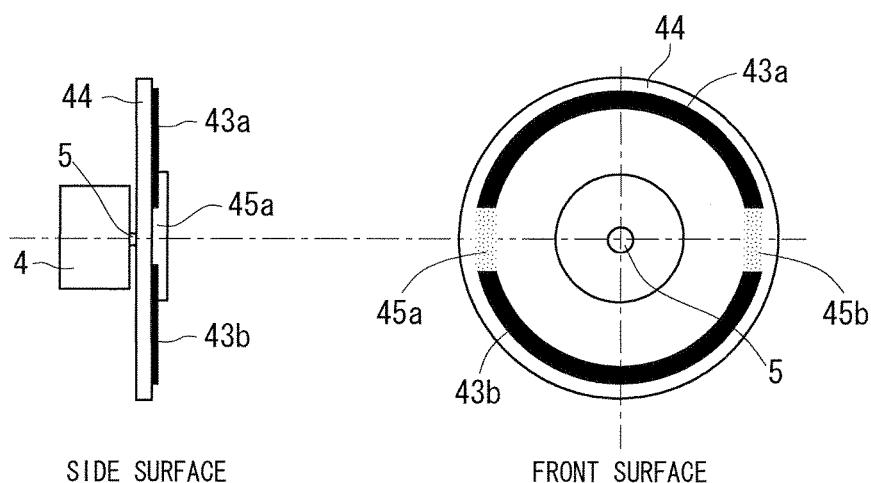
FIG. 6 shows front and side views of a phosphor wheel unit according to a third preferred embodiment of the present invention.

FIG. 6 shows front and side views of a phosphor wheel unit provided in a light source apparatus of a projector according to a third preferred embodiment of the present invention.

As shown in FIG. 6, in a phosphor wheel 44 according to the third preferred embodiment, green phosphors 43*a* and 43*b* are disposed in an annular shape on a disk-shaped metallic base material of the phosphor wheel 44. The green phosphors 43*a* and 43*b* serve to emit fluorescent light in a green wavelength bandwidth when irradiation with excitation light in a blue wavelength bandwidth is carried out. Moreover, a reflection surface (a mirror surface) for reflecting light is provided on a surface of the metallic base material on which the phosphors 43*a* and 43*b* are disposed in the phosphor wheel 44.

Discontinuous portions 45*a* and 45*b* for diffusing and reflecting light are provided between the annular phosphors 43*a* and 43*b*.

The annular phosphors 43*a* and 43*b* and the discontinuous portions 45*a* and 45*b* are disposed point symmetrically with respect to a center of a rotary shaft (a rotary drive shaft 5) of the phosphor wheel 44, respectively. In other words, the discontinuous portions 45*a* and 45*b* are provided in such a manner that a whole weight balance with respect to the rotary shaft of the phosphor wheel 44 is uniform.

Since the other structures are the same as those in the second preferred embodiment, description will be omitted.

Figure 7:
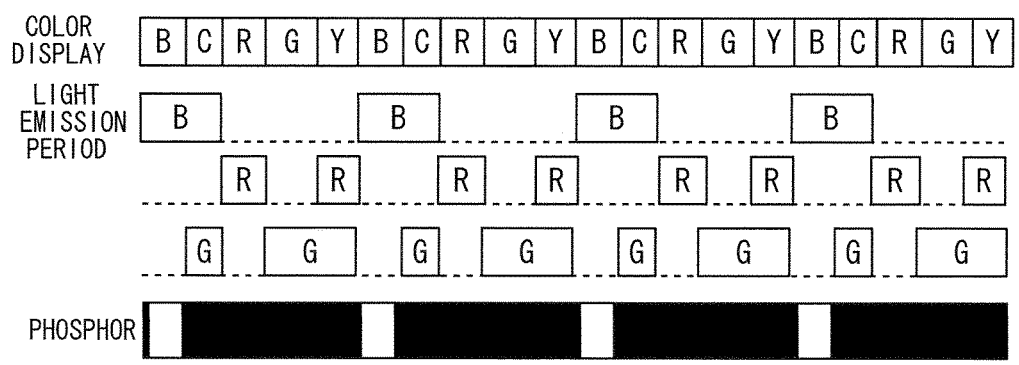
FIG. 7 shows a timing chart of a light emission period of a light source apparatus according to the third preferred embodiment of the present invention.

FIG. 7 shows a timing chart of a light emission period for a light source apparatus according to the third preferred embodiment. The projector having the light source apparatus further includes controller (not shown) that controls light emission of a light source, and the controller controls light emission periods for a green excitation light source, a blue light source and a red light source.

In FIG. 7, the light emission period for the green excitation light source G corresponds to a range (a black part in the drawing) in which the phosphors 43*a* and 43*b* are coated. Moreover, the discontinuous portions 45*a* and 45*b* of the phosphor correspond to a white part in the drawing.

As described above, according to the third preferred embodiment, the discontinuous portions 45*a* and 45*b* for diffusing and reflecting the light are disposed in two places (a plurality of places) of the phosphor wheel 44 in such a manner that the whole weight balance with respect to the rotary shaft of the phosphor wheel 44 is uniform. For this reason, the rotation of the phosphor wheel 44 is stabilized when the phosphor wheel 44 is rotated at a high speed. Moreover, the rotation of the phosphor wheel 44 is stabilized so that a light quantity of fluorescent light emitted from the phosphors 43*a* and 43*b* is made stable and a luminance of a green light source is stabilized. Therefore, it is possible to stabilize a brightness of a image to be projected from the projector. Moreover, light returning to the excitation light source G from the phosphor wheel 44 is almost eliminated. Consequently, it is possible to relieve a risk of causing an operation of a semiconductor laser to be unstable.

Fourth Preferred Embodiment

Figure 8:
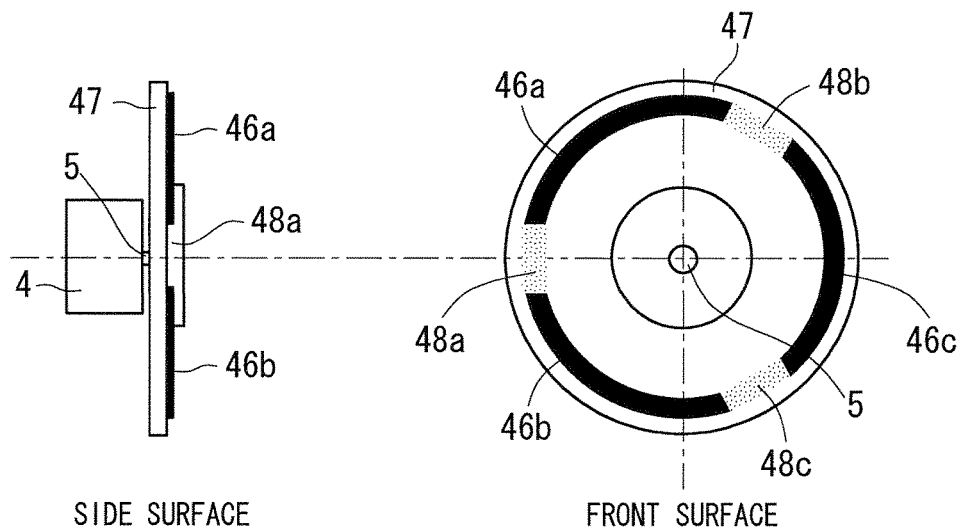
FIG. 8 shows front and side views of a phosphor wheel unit according to a fourth preferred embodiment of the present invention.

FIG. 8 shows front and side views of a phosphor wheel unit provided in a light source apparatus of a projector according to a fourth preferred embodiment of the present invention.

As shown in FIG. 8, in a phosphor wheel 47 according to the fourth preferred embodiment, green phosphors 46*a*, 46*b* and 46*c* are disposed in an annular shape on a disk-shaped metallic base material of the phosphor wheel 47. The green phosphors 46*a*, 46*b* and 46*c* serve to emit fluorescent light in a green wavelength bandwidth when irradiation with excitation light in a blue wavelength bandwidth is carried out.

Discontinuous portions 48*a*, 48*b* and 48*c* for diffusing and reflecting light are provided between the annular phosphors 46*a*, 46*b* and 46*c*.

The annular phosphors 46*a*, 46*b* and 46*c* and the discontinuous portions 48*a*, 48*b* and 48*c* are disposed in such a manner that an interval has an angle of 120 degrees with respect to a center of a rotary shaft (a rotary drive shaft 5) of the phosphor wheel 44, respectively. In other words, the discontinuous portions 48*a*, 48*b* and 48*c* are provided in such a manner that a whole weight balance with respect to the rotary shaft of the phosphor wheel 47 is uniform.

A reflection surface for reflecting light is provided on the surface of the metallic base material on which the phosphors 46*a*, 46*b* and 46*c* are disposed in the phosphor wheel 47.

Since the other structures are the same as those in the third preferred embodiment, description will be omitted. Moreover, a control timing for a light emission period of each light source is the same as that in the third embodiment (FIG. 7). A time on an axis of abscissa in FIG. 7 is varied depending on a rotary speed of the phosphor wheel 47.

As described above, according to the fourth preferred embodiment, the discontinuous portions 48*a*, 48*b* and 48*c* for diffusing and reflecting the light are disposed in three places (a plurality of places) of the phosphor wheel 47 in such a manner that the whole weight balance with respect to the rotary shaft of the phosphor wheel 47 is uniform. For this reason, the rotation of the phosphor wheel 47 is stabilized when the phosphor wheel 47 is rotated at a high speed. Moreover, the rotation of the phosphor wheel 47 is stabilized so that a light quantity of fluorescent light emitted from the phosphors 46*a*, 46*b* and 46*c* is made stable and a luminance of a green light source is stabilized. Therefore, it is possible to stabilize a brightness of a image to be projected from the projector. Furthermore, light returning to the excitation light source G from the phosphor wheel 47 is almost eliminated. Consequently, it is possible to relieve a risk of causing an operation of a semiconductor laser to be unstable.

The discontinuous portion to be provided in the annular phosphor of the phosphor wheel may further be disposed in a plurality of places in such a manner that the weight balance with respect to the center of the rotary shaft of the phosphor wheel is kept. In this case, when the phosphor wheel is rotated at a high speed, the rotation of the phosphor wheel is stabilized in the same manner as in the third and fourth preferred embodiments. Moreover, the rotation of the phosphor wheel is stabilized so that a light quantity of the fluorescent light emitted from the phosphor is made stable and the luminance of the light source is stabilized. Consequently, it is possible to stabilize a brightness of a image to be projected from the projector.

Fifth Preferred Embodiment

Figure 9:
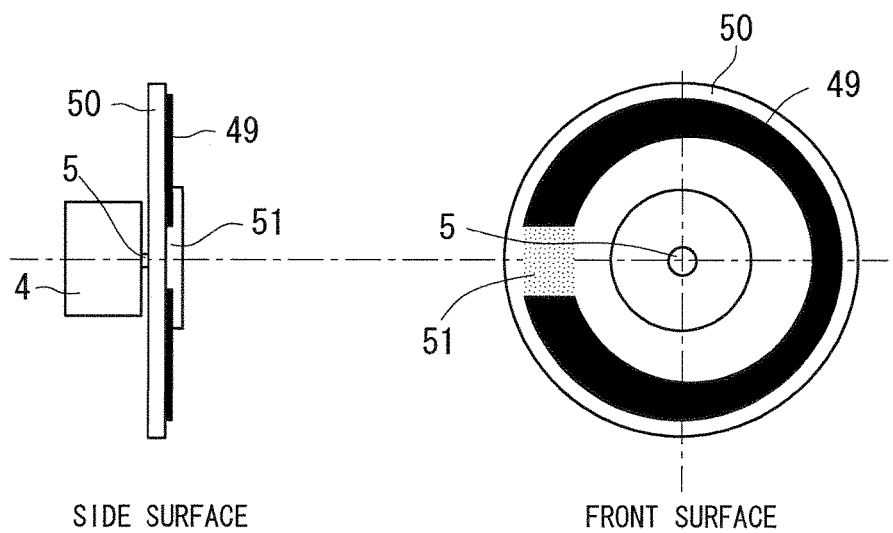
FIG. 9 shows front and side views of a phosphor wheel unit according to a fifth preferred embodiment of the present invention.

FIG. 9 shows front and side views of a phosphor wheel unit provided in a light source apparatus of a projector according to a fifth preferred embodiment of the present invention.

As shown in FIG. 9, in a phosphor wheel 50 according to the fifth preferred embodiment, a green phosphor 49 is disposed in an annular shape on a disk-shaped metallic base material of the phosphor wheel 50. The green phosphor 49 serves to emit fluorescent light in a green wavelength bandwidth when irradiation with excitation light in a blue wavelength bandwidth is carried out.

A discontinuous portion 51 for diffusing and reflecting light is provided in the annular phosphor 49.

The phosphor 49 is disposed with a uniform thickness thereof and a variation in a width thereof in such a manner that a whole weight balance with respect to a center of a rotary shaft of the phosphor wheel 50 is uniform. In other words, the width of the phosphor 49 is decreased as a distance to the discontinuous portion 51 increases. A minimum width of the phosphor 49 is greater than a spot diameter of excited light subjected to irradiation, and has a sufficient width of the phosphor which does not influence a light quantity of fluorescent light to be emitted. The arrangement of the phosphor without an equal width can be executed stably by a method such as screen printing in place of an application device such as a dispenser.

Since the other structures and operations (a control timing for a light emission period of each light source) is the same as in the first preferred embodiment, description will be omitted.

As described above, according to the fifth preferred embodiment, the discontinuous portion 51 and the phosphor 49 are disposed in the phosphor wheel 50 in such a manner that the whole weight balance with respect to the rotary shaft of the phosphor wheel 50 is uniform. For this reason, the rotation of the phosphor wheel 50 is stabilized when the phosphor wheel 50 is rotated at a high speed. Moreover, the rotation of the phosphor wheel 50 is stabilized so that a light quantity of fluorescent light emitted from the phosphor 49 is made stable and a luminance of a green light source is stabilized. Therefore, it is possible to stabilize a brightness of a image to be projected from the projector. Furthermore, light returning to an excitation light source G from the phosphor wheel 50 is almost eliminated. Consequently, it is possible to relieve a risk of causing an operation of a semiconductor laser to be unstable.

Sixth Preferred Embodiment

FIG. 10 shows front and side views of a phosphor wheel unit provided in a light source apparatus of a projector according to a sixth preferred embodiment of the present invention.

As shown in FIG. 10, in a phosphor wheel 52 according to the sixth preferred embodiment, a green phosphor 1 is disposed in an annular shape on a disk-shaped metallic base material of the phosphor wheel 52. The green phosphor 1 serves to emit fluorescent light in a green wavelength bandwidth when irradiation with excitation light in a blue wavelength bandwidth is carried out.

A discontinuous portion 53 for diffusing and reflecting light is provided in the annular phosphor 1.

The phosphor 1 annularly applies a phosphor material onto the reflection surface of the disk-shaped metallic base material by using a dispenser or the like and provides a clearance (the discontinuous portion 53) in such a manner that an application start part and an application end part for the phosphor material do not overlap with each other.

Moreover, the phosphor 1 has an application region 54 provided on an inside of the discontinuous portion 53 (in the vicinity of the discontinuous portion 53). A phosphor material is auxiliarily applied to the application region 54. Differently from the phosphor 1 having the discontinuous portion 53, the application region 54 is not irradiated with excitation light. Accordingly, the application region 54 does not emit fluorescent light. Moreover, the application region 54 is provided in such a manner that a whole weight balance with respect to a rotary shaft of the phosphor wheel 52 is uniform.

Since the other structures and operations (a control timing for a light emission period of each light source) are the same as those in the first preferred embodiment, description will be omitted.

As described above, according to the sixth preferred embodiment, the auxiliary application region 54 is disposed in such a manner that the whole weight balance with respect to the rotary shaft of the phosphor wheel 52 is uniform. For this reason, the rotation of the phosphor wheel 52 is stabilized when the phosphor wheel 52 is rotated at a high speed. Moreover, the rotation of the phosphor wheel 52 is stabilized so that a light quantity of fluorescent light emitted from the phosphor 1 is made stable and a luminance of a green light source is stabilized. Therefore, it is possible to stabilize a brightness of a image to be projected from the projector. Furthermore, light returning to an excitation light source G from the phosphor wheel 52 is almost eliminated. Consequently, it is possible to relieve a risk of causing an operation of a semiconductor laser to be unstable.

Seventh Preferred Embodiment

Figure 11:
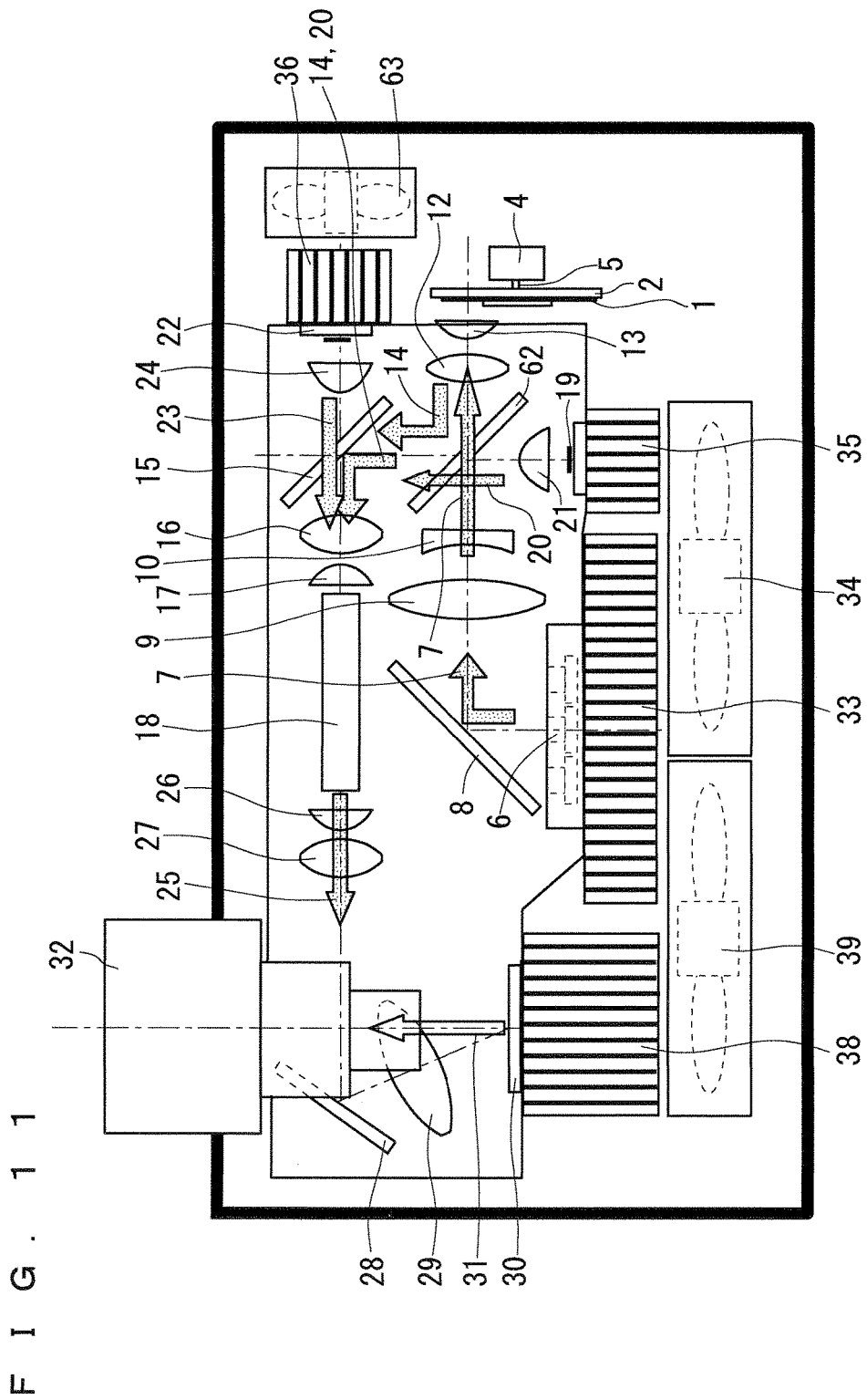
FIG. 11 shows a plan view of an optical system of a projector according to a seventh preferred embodiment of the present invention.

FIG. 11 shows a plan view of an optical system of a projector according to a seventh preferred embodiment.

In the optical system of the projector according to the seventh preferred embodiment, the arrangement of a phosphor wheel unit and a blue light source is changed as compared with the optical system of the projector according to the first preferred embodiment (see FIG. 3). Since the other arrangement is the same as that in the first preferred embodiment, description will be omitted.

As shown in FIG. 11, excitation light 7 having a blue wavelength which is emitted from an excitation light source 6 for emitting excitation light in a blue wavelength bandwidth is reflected by a reflection mirror 8 and then passes through condensing lenses 9 and 10 in order, and is transmitted through a dichroic mirror 62 for transmitting band light having a blue wavelength and reflecting band light having a green wavelength, and then passes through condensing lenses 12 and 13 and a phosphor 1 of a phosphor wheel 2 is irradiated with the excitation light 7. The excitation light 7 subjected to the irradiation is emitted as fluorescent light 14 in a green wavelength bandwidth from the green phosphor 1.

The fluorescent light 14 in the green wavelength bandwidth emitted from the phosphor 1 of the phosphor wheel 2 passes through the condensing lenses 13 and 12 in order and is reflected by the dichroic mirror 62, and is then reflected by a dichroic mirror 15 for reflecting band light having a blue wavelength and a green wavelength and transmitting band light having a red wavelength, and passes through condensing lenses 16 and 17 in order and is incident on a light pipe 18 for converting light emitted from the light source into a luminous flux 25 having uniform intensity distribution.

Moreover, blue light 20 emitted from a blue light source 19 passes through a condensing lens 21 and passes through the dichroic mirror 62, and then, is further reflected by the dichroic mirror 15 and passes through the condensing lenses 16 and 17 in order, and is incident on the light pipe 18.

Moreover, red light 23 emitted from a red light source 22 cooled by an air flow generated from a cooling fan 63 passes through a condensing lens 24 and is transmitted through the dichroic mirror 15, and then passes through the condensing lenses 16 and 17 in order and is incident on the light pipe 18.

The luminous flux 25 having uniform intensity distribution which is obtained by passage through the light pipe 18 passes through light guide lenses 26 and 27 in order, and is reflected by an irradiation mirror 28 and then passes through a condensing lens 29 so that a image generating element 30 is irradiated with the luminous flux 25. After the image generating element 30 is irradiated with the luminous flux 25, projection image light 31 generated by the image generating element 30 passes through a projection lens 32 and is then projected onto a screen (not shown) for projecting a image.

As described above, according to the seventh preferred embodiment, it is possible to obtain the same effects as those in the first preferred embodiment even if the arrangement of the phosphor wheel unit and the blue light source is changed as shown in FIG. 11.

While the invention has been shown and described in detail, the foregoing description is in all aspects illustrative and not restrictive. It is therefore understood that numerous modifications and variations can be devised without departing from the scope of the invention.

What is claimed is:

1. A light source apparatus comprising:
    a phosphor wheel having a phosphor disposed in an annular shape on a disk-shaped base material, the phosphor serving to emit fluorescent light from excitation light, said fluorescent light having a predetermined color, and said annular shape having a discontinuous portion for diffusing and reflecting light, said discontinuous portion being a part of said annular shape in which phosphor is not disposed;
    a rotation driver that rotatively drives said phosphor wheel;
    an excitation light source for emitting said excitation light with which a passage position of said annular phosphor is irradiated with respect to said phosphor wheel to be rotatively driven by said rotation driver;
    at least two other light sources having different colors than one another, and each having a different color from said predetermined color which is necessary to create combined light for projecting an image;
    a light source optical system for combining light of only said at least two other light sources and said fluorescent light emitted by said phosphor wheel when irradiated with said excitation light source; and
    a controller that controls light emission of said excitation light source and said at least two other light sources synchronously with a position of said discontinuous portion with respect to an irradiation position of said excitation light,
    wherein said phosphor wheel includes an application region which is provided on an inside of said discontinuous portion in a radial direction of said phosphor wheel and to which said phosphor is applied.

2. The light source apparatus according to claim 1, wherein said controller controls an irradiation period for said excitation light so as to be equal to or shorter than a period corresponding to the length of said phosphor.

3. A projector comprising the light source apparatus according to claim 1.

* * * * *